US008218224B2

(12) United States Patent
Kwak et al.

(10) Patent No.: US 8,218,224 B2
(45) Date of Patent: Jul. 10, 2012

(54) LAMINATED ELECTRICALLY TINTABLE WINDOWS

(75) Inventors: Byung-Sung Leo Kwak, Portland, OR (US); Dieter Haas, San Jose, CA (US); Stefan Bangert, Hessen (DE); Nety M. Krishna, Sunnyvale, CA (US); Winfried Hoffmann, Hanau-Steinheim (DE)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 12/772,930

(22) Filed: May 3, 2010

(65) Prior Publication Data

US 2010/0208326 A1 Aug. 19, 2010

Related U.S. Application Data

(62) Division of application No. 12/333,676, filed on Dec. 12, 2008, now Pat. No. 7,710,671.

(51) Int. Cl.
*G02F 1/15* (2006.01)
*G02F 1/153* (2006.01)

(52) U.S. Cl. ........................................ 359/265; 359/275

(58) Field of Classification Search .......... 359/265–275, 359/609, 900; 345/49, 105; 252/586
See application file for complete search history.

(56) References Cited

U.S. PATENT DOCUMENTS

| | | | |
|---|---|---|---|
| 5,231,531 A | 7/1993 | Defendini et al. | |
| 5,239,406 A | 8/1993 | Lynam | |
| 5,404,244 A | 4/1995 | Van Dine et al. | |
| 5,604,626 A | 2/1997 | Teowee et al. | |
| 5,648,758 A | 7/1997 | Tweadey, II et al. | |
| 5,659,417 A | 8/1997 | Van Dine et al. | |
| 5,699,192 A | 12/1997 | Van Dine et al. | |
| 5,724,175 A | 3/1998 | Hitchwa et al. | |
| 5,724,177 A | 3/1998 | Ellis, Jr. et al. | |
| 5,757,537 A | 5/1998 | Ellis, Jr. et al. | |
| 5,824,374 A | 10/1998 | Bradley, Jr. et al. | |
| 5,959,762 A | 9/1999 | Bandettini et al. | |
| 5,995,271 A | 11/1999 | Zieba et al. | |
| 6,245,265 B1 | 6/2001 | Chung et al. | |
| 6,297,900 B1 | 10/2001 | Tulloch et al. | |

(Continued)

OTHER PUBLICATIONS

International Search Report and Written Opinion from International PCT Application No. PCT/US2009/066266 issued Jun. 23, 2010.

(Continued)

*Primary Examiner* — Jack Dinh
(74) *Attorney, Agent, or Firm* — Mark J. Danielson; Pillsbury Winthrop Shaw Pittman LLP

(57) ABSTRACT

A method of manufacturing electrically tintable window glass with a variety of sizes and functionalities is described. The method comprises: (a) providing a large format glass substrate; (b) fabricating a plurality of electrically tintable thin film devices on the large format glass substrate; (c) cutting the large format glass substrate into a plurality of electrically tintable pieces, each electrically tintable piece including one of the plurality of electrically tintable thin film devices; (d) providing a plurality of window glass pieces; (e) matching each one of the plurality of electrically tintable pieces with a corresponding one of the plurality of window glass pieces; and (f) laminating each of the matched electrically tintable pieces and window glass pieces. The lamination may result in the electrically tintable device either being sandwiched between the glass substrate and the window glass piece or on the surface of the laminated pieces. The electrically tintable device is an electrochromic device.

24 Claims, 4 Drawing Sheets

SECTION X-X

U.S. PATENT DOCUMENTS

| | | |
|---|---|---|
| 6,466,298 B1 | 10/2002 | Fix et al. |
| 6,841,482 B2 | 1/2005 | Boyle |
| 7,154,657 B2 * | 12/2006 | Poll et al. ............ 359/265 |
| 7,277,215 B2 | 10/2007 | Greer |
| 7,361,252 B2 | 4/2008 | Slovak et al. |
| 7,525,714 B2 | 4/2009 | Poll et al. |
| 2007/0243328 A1 | 10/2007 | Liu et al. |
| 2008/0212160 A1 | 9/2008 | Fanton et al. |
| 2009/0304912 A1 | 12/2009 | Kwak |

OTHER PUBLICATIONS

"Advancement of Electrochromic Windows," The Lawrence Berkeley National Laboratory, Environmental Energy Technologies Division, Building Technologies Department (Jul. 2006) http://windows.lbl.gov/comm_perf/Electrochromic/ec_desi.html, Apr. 22, 2008.

Granqvist, Nature Materials, 5(2):89-90 (Feb. 2006).

"Designing Electrochromic Windows for Buildings," BT: Electrochromic Windows Design, downloaded Sep. 25, 2008 from http://windows.lbl.gov/comm_perf/Electrochromic/ed_desi.html; 2p.

"What Types of Switchable Windows are There and What is their Commercial Status," downloaded Sep. 25, 2008 from http://windows.lbl.gov/comm_perf/Electrochromic/ed_desi.html; 2p.

"What are Electrochromic Windows," BT: Electrochromic Windows Design, downloaded Sep. 25, 2008 from http://windows.lbl.gov/comm_perf/Electrochromic/ed_desi.html; 2p.

"Window Materials & Assemblies: Emerging Technologies," downloaded Sep. 22, 2008 from http://www.commercialwindows.umn.edu/materials_tech3.php, 2p.

"ASI OPAK® thin-film solar module, opaque," product brochure, 2005, 2 pages, available on-line at: http://www.schott.com/photovoltaic/english/download/asiopak-30-sg_e_0607.pdf; Schott Solar GmbH Phototronics, Putzbrunn, Germany.

"ASI THRU® thin-film solar module, semitransparent," product brochure, 2005, 2 pages; Schott Solar GmbH Phototronics, Putzbrunn, Germany.

* cited by examiner

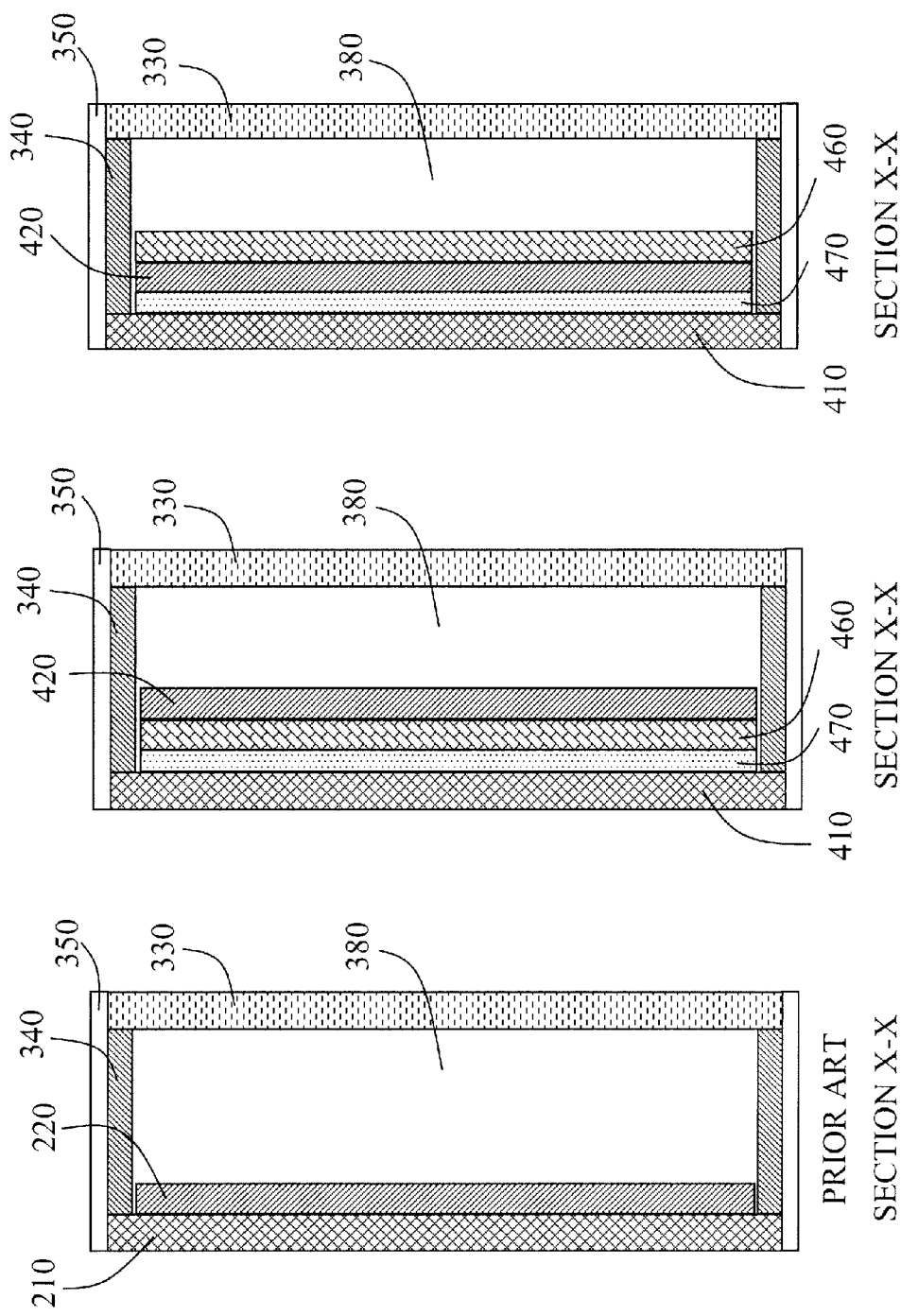

LAMINATED ELECTRICALLY TINTABLE WINDOWS

CROSS-REFERENCE TO RELATED APPLICATIONS

This application is a divisional of, and claims the benefit of, U.S. patent application Ser. No. 12/333,676 filed Dec. 12, 2008, which is incorporated by reference herein.

FIELD OF THE INVENTION

The present invention relates generally to electrically tintable windows and more specifically to improved manufacturing methods for electrically tintable windows that accommodate a variety of window sizes and functionalities while maintaining high yield, high throughput and low cost.

BACKGROUND OF THE INVENTION

Smart windows are glazing units that incorporate devices which have controllable optical and thermal transmission properties. The devices are generally in the form of layers either directly deposited on, or laminated to, the glass surface. Integration of the so-called smart windows into a building provides the opportunity to control internal light levels and temperature by adjusting the optical and thermal properties of the windows. Electrochromic devices, suspended particle devices (SPDs) and polymer dispersed liquid crystal (PDLC) devices are all examples of devices that are incorporated in smart windows; light transmission in these particular devices is electrically controllable, and smart windows incorporating these devices are also known as electrically tintable windows.

Electrochromic devices are currently incorporated in a range of products, including smart windows, rear-view mirrors, and protective glass for museum display cases. Electrochromic devices are devices that change light (and heat) transmission properties in response to voltage applied across the device. Electrochromic devices can be fabricated which electrically switch between transparent and translucent states (where the transmitted light is colored). Furthermore, certain transition metal hydride electrochromic devices can be fabricated which switch between transparent and reflective states. A more detailed discussion of the functioning of electrochromic devices is found in Granqvist, C.-G., Nature Materials, v5, n2, February 2006, p 89-90. Electrochromic devices are currently the most promising electrically tintable devices for use in smart windows.

SPDs and PDLC devices have also been incorporated into smart windows. SPDs are devices which have a thin film containing a suspension of numerous microscopic particles and transparent electrodes on either side of the film. The particles are randomly oriented and reduce the transmittance of the film. However, when an electric field is applied across the film, the particles align with the field, increasing the optical transmittance of the film. PDLCs comprise a liquid crystal layer sandwiched between transparent conductors on a thin plastic film. The liquid crystal particles are randomly oriented in the layer and scatter light—the layer is translucent. However, when a field is applied across the liquid crystal layer, the crystals are aligned to provide an optically transparent film. The degree of transparency is controlled by the voltage applied across the liquid crystal layer.

When electrochromic devices are incorporated in smart windows there is a need for the electrochromic devices to have a guaranteed lifetime of at least ten years and preferably thirty years or more. However, exposure of the electrochromic devices to atmospheric oxygen and water can degrade the performance of the devices and reduce the lifetime of the devices. Incorporation of the electrochromic device on an interior surface of an insulated glass unit (IGU) may provide the protected environment required for satisfactory performance over thirty years or more. SPDs and PDLC devices also benefit from the environmental protection afforded by an IGU.

Smart windows are generally in the form of an IGU. An IGU 100 including an electrically tintable device 220 is shown in FIGS. 1-3. Controller and power supply 190 is attached to the electrically tintable device 220 by electrical leads 195. FIG. 3 shows a cross section of the IGU, not to scale, which is comprised of two pieces of glass 210 and 330 spaced apart by a frame 340 along all four edges and sealed together along all four edges by sealant 350. The interior volume 380 is filled with an inert gas, such as argon, so as to provide thermal insulation and a non-oxidizing ambient. When an electrically tintable device 220 is incorporated into the IGU it is fabricated on the exterior piece of glass 210 (the outdoors facing piece) and is positioned on the interior facing surface thereof. See FIG. 2, which is a top view of the interior surface of the exterior piece of glass 210. The inert environment within the IGU does not affect the performance of an electrically tintable device 220.

The exterior piece of glass 210 in an IGU may be tinted, laminated, tempered, heat strengthened, etc. When an electrochromic device 220 is incorporated into an IGU as described above, the exterior piece of glass 210 will be subject to thermal stress. Furthermore, if the exterior piece of glass 210 is also tinted this will increase the thermal stress in the glass. Consequently, tempered or heat strengthened glass is often specified and needed.

Currently, the underlying philosophy for manufacturing smart windows including electrically tintable devices is to incorporate all glass functionalities—tintable device, color/tint, thickness, strength, size, etc. into a single sheet of glass. However, this philosophy leads to an inflexible and costly manufacturing process, with a limited range of integratable functionalities, which are a consequence of the conflicting manufacturing requirements for the different functionalities. For example, consider the problems with a manufacturing process for smart windows with tempered glass and an electrically tintable electrochromic device, where a range of window sizes is desired. The processing requirements for the two features—tempered glass and an electrochromic device—are incompatible with an integrated process including glass sizing. This is because after the glass has been tempered it cannot be cut to produce different size pieces, and if the electrochromic device is deposited on the glass prior to tempering, then the electrochromic device cannot withstand the process required to temper the glass. Therefore, the glass must be cut and tempered prior to deposition of the electrochromic device layers. This results in the requirement for the manufacturing equipment to handle a variety of glass sheet sizes, which results in costly manufacturing equipment and processes. Furthermore, handling a variety of different substrate sizes may have a negative impact on yield. For example, different sizes of glass sheet will present a different electric field distribution in a deposition chamber which may negatively impact the uniformity of deposited layers. (This is significant in deposition techniques involving ionized species—for example, plasma enhanced deposition.) Another example is that of combining different glass thicknesses with deposition of an electrochromic device. When depositing the layers of an electrochromic device, as for most typical thin film deposition processes, control of the substrate temperature is desirable; however, different thicknesses of glass will heat and cool at different rates, leading to lower throughput for thicker glass and to difficulties in controlling process uniformity. Clearly, there is a need for manufacturing processes for smart windows that are more flexible and compatible with lower cost, high yield and high throughput manufacturing.

SUMMARY OF THE INVENTION

Embodiments of this invention are based on the concept of (1) separating out various glass functionalities into a number of pieces of glass and (2) exploiting glass lamination technologies to combine the glass pieces to provide an integrated glass product with enhanced functionality. This approach is particularly valuable when the desired different functionalities lead to incompatible processing requirements and/or compromised performance. A method of manufacturing electrically tintable window glass is provided which readily allows for a wide variety of window sizes and functionalities. The method includes fabricating the electrically tintable device independently of the window glass, and lastly laminating the electrically tintable device to the window glass. This approach allows for much greater process flexibility when fabricating the electrically tintable device, as well as providing greater flexibility in the specification of the window glass. These concepts and methods allow for cost effective, high yield and high throughput manufacturing of electrically tintable windows. The electrically tintable window glass fabricated using the methods described herein may be incorporated into IGUs, and other types of architectural glass.

The approach of embodiments of this invention allows for the electrically tintable devices to be fabricated on a standard size and thickness substrate—all of the thin film processing is done on a single size of glass substrate. This provides a stable production environment suitable for high volume manufacturing with good process control, high throughput and high yield. Only after the individual electrically tintable devices are cut from the substrate is there a need to handle different sized substrates.

According to aspects of this invention, a method of manufacturing electrically tintable window glass with a variety of sizes and functionalities comprises: (a) providing a large format glass substrate; (b) fabricating a plurality of electrically tintable thin film devices on the large format glass substrate; (c) cutting the large format glass substrate into a plurality of electrically tintable pieces, each electrically tintable piece including one of the plurality of electrically tintable thin film devices; (d) providing a plurality of window glass pieces; (e) matching each one of the plurality of electrically tintable pieces with a corresponding one of the plurality of window glass pieces; and (f) laminating each of the matched electrically tintable pieces and window glass pieces. The lamination may result in the electrically tintable device either being sandwiched between the glass substrate and the window glass piece or on the surface of the laminated pieces. The electrically tintable device may be an electrochromic device; although, the electrically tintable device may be a SPD, a PDLC device or a gasochromic device. The electrically tintable device is typically a thin film device and may be manufactured using processes requiring: robotic handling of substrates; processing in vacuum; plasma processing; and/or substrate heating. The glass pieces may be heat treated, tempered, tinted, laminated, high strength, etc. and may be chosen from a variety of different sizes and thicknesses.

Furthermore, manufacturing methods of embodiments of this invention embrace the concept of fabricating the electrically tintable devices on a production line where a standard large format glass substrate is used, irrespective of the sizes of the ultimate electrically tintable device. Accordingly, further aspects of this invention include a method of manufacturing electrically tintable window glass with a variety of sizes and functionalities comprising: (a) providing a multiplicity of identical large format glass substrates; (b) fabricating a plurality of electrically tintable thin film devices on the multiplicity of large format glass substrates; (c) cutting the multiplicity of large format glass substrates into a plurality of electrically tintable pieces, each electrically tintable piece including one of the plurality of electrically tintable thin film devices; (d) providing a plurality of window glass pieces; (e) matching each one of the plurality of electrically tintable pieces with a corresponding one of the plurality of window glass pieces; and (f) laminating each of the matched electrically tintable pieces and window glass pieces.

According to yet further aspects of this invention, an electrically tintable window comprises: a piece of window glass; a glass substrate; an electrochromic thin film device formed on the glass substrate; and a lamination layer between the electrochromic thin film device and the window glass, the lamination layer attaching the electrochromic thin film device to the window glass. The lamination layer may include a bonding agent such as polyvinyl butyral (PVB) and ethylene vinyl acetate (EVA).

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 3 is a cross-sectional view of the insulating glass unit of FIG. 1;

FIG. 4 shows a cross-sectional view of the insulating glass unit of FIG. 1, with a configuration according to a first embodiment of the invention;

FIG. 5 shows a cross-sectional view of the insulating glass unit of FIG. 1, with a configuration according to a second embodiment of the invention.

DETAILED DESCRIPTION

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, embodiments of this invention are based on the concept of (1) separating out various glass functionalities into a number of pieces of glass and (2) exploiting glass lamination technologies to combine the glass pieces to provide an integrated glass product with enhanced functionality. The examples provided herein are directed to the lamination of two glass pieces with different functionalities; however, the concepts are applicable to the lamination of three or more glass pieces with different functionalities.

Embodiments of the present invention contemplate an alternative method of manufacturing electrically tintable windows where the electrically tintable device is fabricated independently of the window glass, and then the window glass is laminated to the electrically tintable device. The method allows for flexibility in the choice of process conditions for fabrication of the electrically tintable device, flexibility in the choice of functionalities of the window glass, and a wide choice of window sizes. These concepts and methods allow for cost effective manufacturing of electrically tintable windows for incorporation into architectural glass, such as IGUs. The examples provided in the detailed description are directed to thin film electrochromic electrically tintable devices; however, the concepts are applicable to other electrically tintable devices, including SPDs and PDLC devices.

Figure 1:
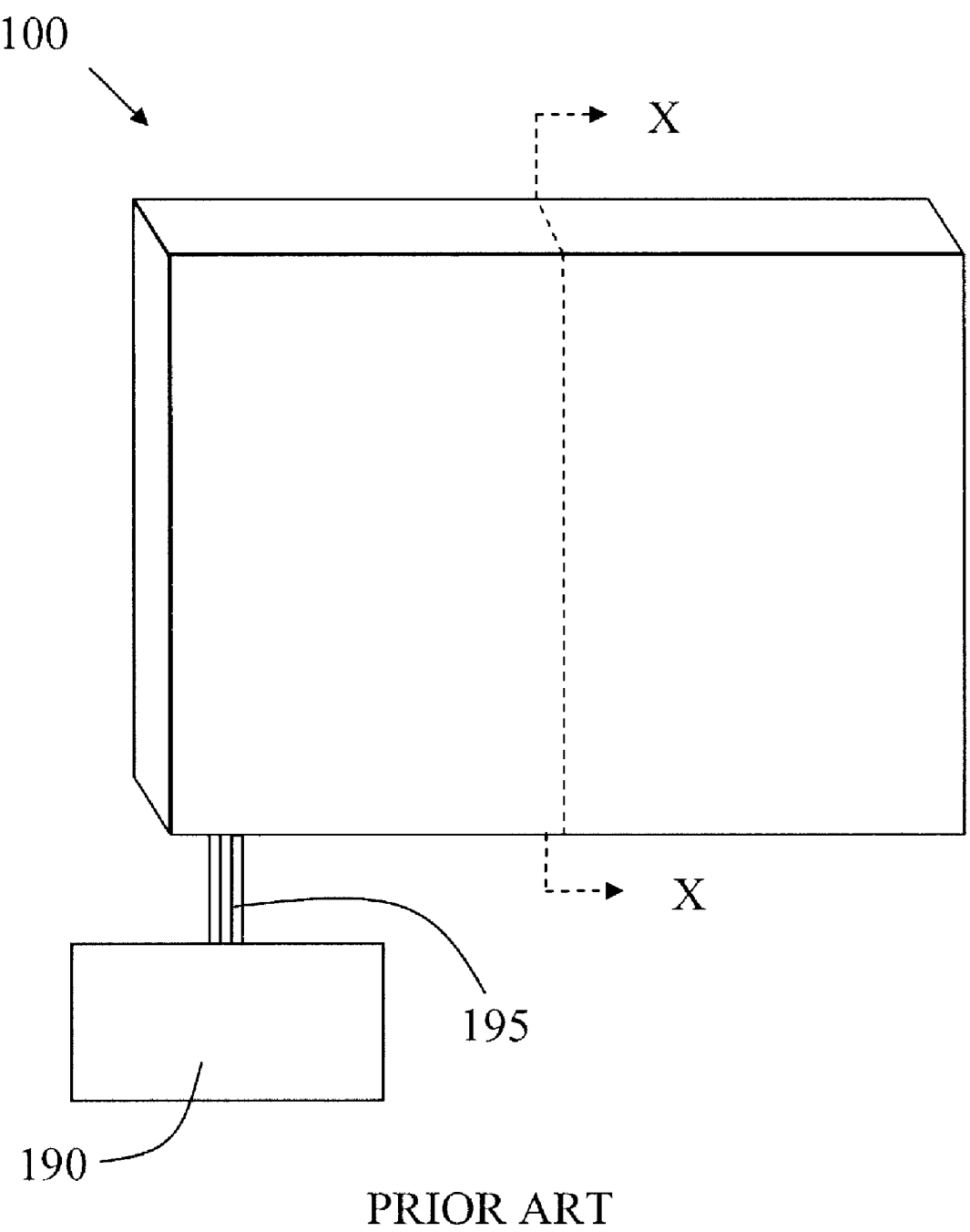
FIG. 1 shows a perspective view of an insulating glass unit incorporating an electrically tintable device.
Figure 2:
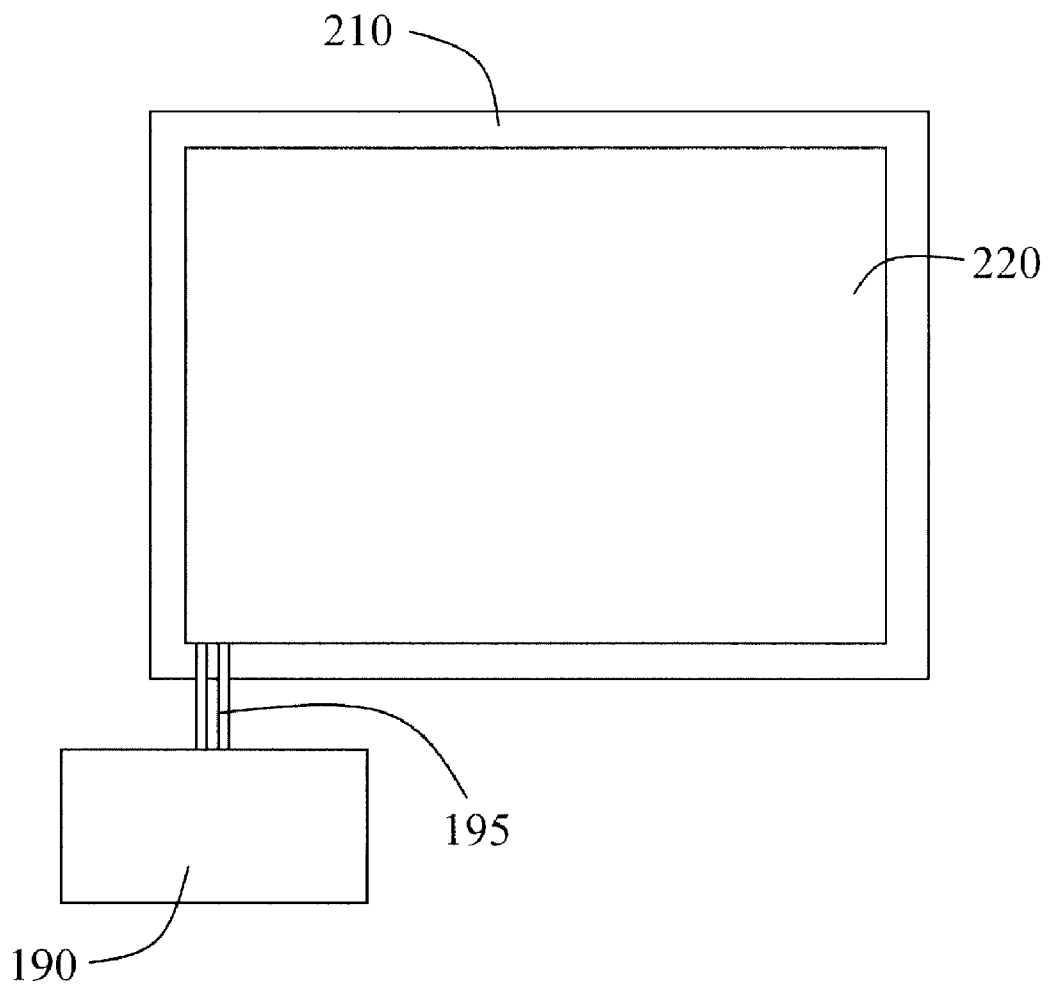
FIG. 2 is a top view of the interior face of the external glass pane of the insulating glass unit of FIG. 1, showing the electrically tintable device.

FIG. 4 shows electrically tintable window glass, not to scale, fabricated according to embodiments of the present invention, incorporated into an IGU, such as the IGU of FIG. 1. The electrically tintable device 420 is on a glass substrate 460. The glass substrate 460, with the electrically tintable device 420, is laminated to the exterior piece of glass 410 (also referred to herein as the window glass). The electrically tintable device 420 is facing away from the exterior piece of glass 410 in the laminated structure. The lamination layer 470 may include bonding agents such as polyvinyl butyral (PVB) and ethylene vinyl acetate (EVA). The lamination process will preferably be a vacuum lamination process in which the stack of the exterior piece of glass 410 and the electrically tintable device 420, with the bonding agent in between, are placed in a vacuum bag, the vacuum bag is evacuated to apply uniform pressure over the stack, and then the bag is placed in a high temperature and high pressure furnace or an autoclave. The process temperature and pressure will depend on the type of electrically tintable device. For electrochromic devices, the temperature ranges typically from 125° C. to 175° C. The temperature range may be broader, although the range will still typically be centered at approximately 150° C. The pressure may be up to 20 bar (and possibly higher), as needed—a typical pressure may be approximately 13 bar. This process is controlled to avoid damaging the electrically tintable device during lamination. The use of a vacuum bag is only one example of a method for providing uniform pressure without damaging the electrically tintable device 420. Other methods may be used providing the pressure and temperature can be applied without damaging the electrically tintable device 420.

FIG. 5 shows an alternative configuration to that of FIG. 4. In FIG. 5, the electrically tintable device is facing the exterior piece of glass 410 in the laminated structure—the electrically tintable device 420 is in contact with the lamination layer 470.

In this embodiment, the lamination process may be a vacuum lamination process as described above, or the stack may be rolled at an intermediate temperature and then placed in a high temperature and high pressure furnace or autoclave for final lamination. (Rolling at an intermediate temperature, rather than higher temperature, is expected to provide a more uniform pressure on the device and thus better quality lamination in terms of adhesion strength and physical appearance.)

When the electrically tintable device is an electrochromic device, protection of the device from environmental oxidants should also be considered, as discussed above. This protection may be provided by incorporation into an IGU. Alternatively, or in addition, an encapsulation layer (not shown) may be provided, as described in U.S. patent application Ser. No. 12/134,437 to Kwak et al. Such an encapsulation layer acts as a diffusion barrier to undesirable oxidants.

Figure 6:
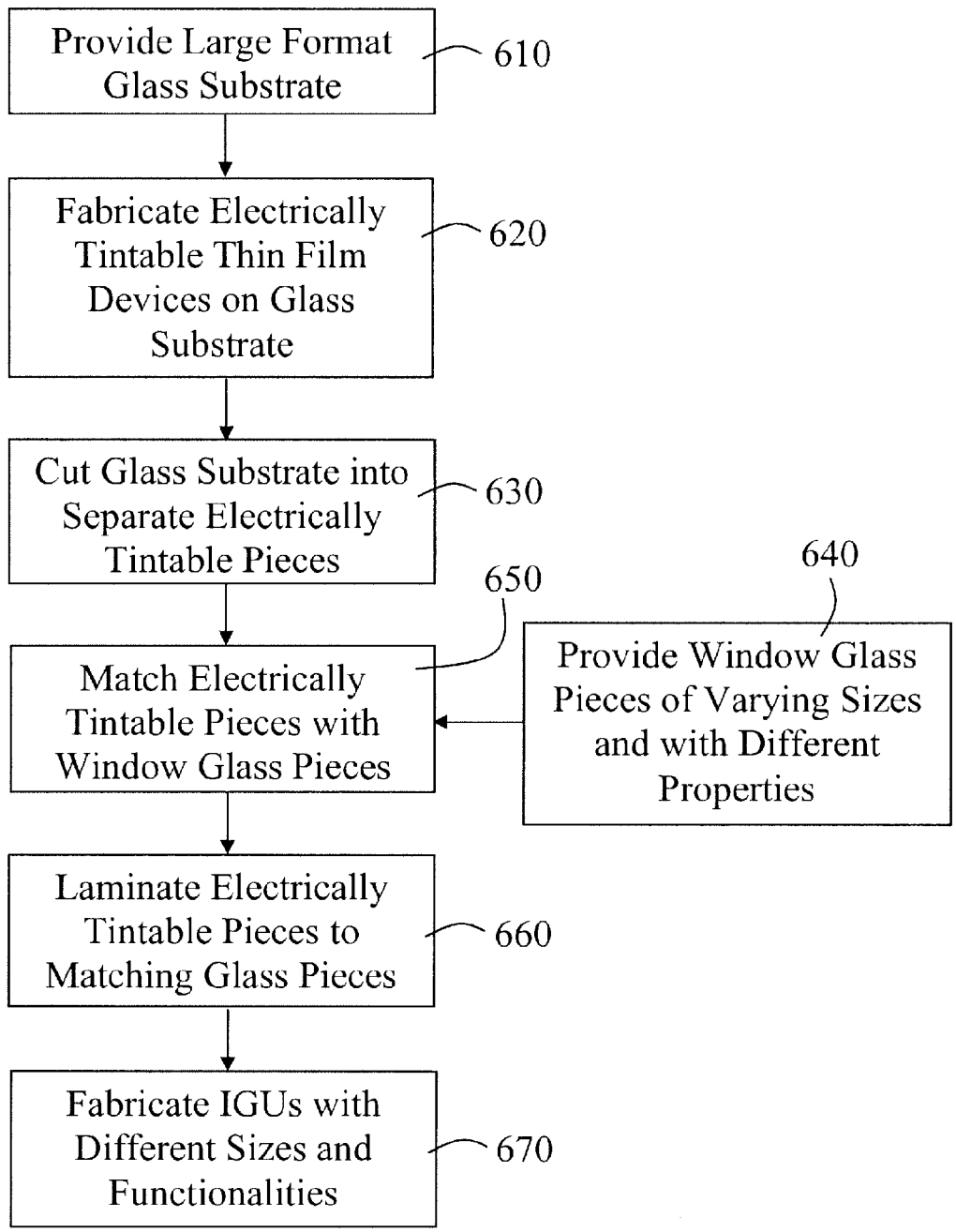
FIG. 6 shows a process flow for fabricating insulating glass units with electrically tintable devices, according to embodiments of the invention.

FIG. 6 shows a process flow for the manufacture of electrically tintable window glass according to embodiments of the present invention. The method comprises: providing a large format glass substrate (610); fabricating a plurality of electrically tintable thin film devices on the large format glass substrate (620); cutting the large format glass substrate into a plurality of electrically tintable pieces, each electrically tintable piece including one of the plurality of electrically tintable thin film devices (630); providing a plurality of window glass pieces, which may be of varying sizes and with different properties (640); matching each one of the plurality of electrically tintable pieces with a corresponding one of the plurality of window glass pieces (650); laminating each of the matched electrically tintable pieces and window glass pieces (660); and (optionally) fabricating a plurality of insulating glass units (IGUs), which may be of different sizes and functionalities (670).

The electrically tintable device is a thin film device, such as an electrochromic device, and may be manufactured using processes requiring: robotic handling of substrates; processing in vacuum; plasma processing; and/or substrate heating. More details of thin film electrochromic devices and fabrication methods for such devices can be found in U.S. patent application Ser. No. 12/134,437 to Kwak et al. Some examples of relevant thin film deposition processes include vacuum deposition techniques such as physical vapor deposition (PVD), chemical vapor deposition (CVD) and plasma enhanced deposition techniques. It may be desirable to heat the substrate during thin film deposition. The window glass pieces may be heat treated, tempered, tinted, laminated, high strength, etc. and may be chosen from a variety of different sizes and thicknesses. Since the fabrication of the electrically tintable device is done on a separate substrate, there is much greater flexibility in the processing of the device and in the specification of the window glass pieces. For example, in the preparation of the window glass pieces, sheets of glass may be cut into pieces of the desired sizes and then tempered. Multiple electrically tintable devices may be manufactured efficiently on a large glass substrate, and then the individual devices can be cut from the sheet. The tempered pieces and the devices can then be laminated to form an electrically tintable window, suitable for integrating into an IGU.

The electrically tintable pieces may all be the same size, or they may be different sizes. See process 630 in FIG. 6. In other words, the glass substrate with the electrically tintable devices may have been cut into a plurality of equally sized pieces, or into a plurality of differently sized pieces, depending on the electrically tintable devices that have been fabricated on the substrate. The window glass pieces will be provided in sizes to correspond to the sizes of the electrically tintable pieces, all according to the specification of the electrically tintable window glass. See processes 640 and 650 in FIG. 6. Generally, the electrically tintable pieces will be smaller than or equal to the window glass pieces, as shown in FIGS. 2-5. (In an alternative embodiment of the device shown in FIG. 4, the glass substrate 460 is the same size as the window glass piece 410, and the frame 340 sits on the surface of the glass substrate 460. Although, the electrically tintable device 420 should still be smaller than the window glass piece 410, so as to fit within the frame 340 and sealant 350.)

Furthermore, according to embodiments of the present invention the process flow of FIG. 6 can be extended to manufacturing processes for electrically tintable windows where a multiplicity of identical large format substrates are processed. Accordingly, a method of manufacturing electrically tintable window glass with a variety of sizes and functionalities comprises: providing a multiplicity of identical large format glass substrates; fabricating a plurality of electrically tintable thin film devices on the multiplicity of large format glass substrates; cutting the multiplicity of large format glass substrates into a plurality of electrically tintable pieces, each electrically tintable piece including one of the plurality of electrically tintable thin film devices; providing a plurality of window glass pieces; matching each one of the plurality of electrically tintable pieces with a corresponding one of the plurality of window glass pieces; laminating each of the matched electrically tintable pieces and window glass pieces; and (optionally) fabricating a plurality of insulating glass units (IGUs), which may be of different sizes and functionalities. The manufacturing process includes both serial processing of multiple identical substrates, and where processing permits, parallel processing of multiple identical substrates.

The manufacturing methods of the present invention are also applicable to IGUs which control light transmission using suspended particle devices (SPDs), polymer dispersed liquid crystal (PDLC) devices and gasochromic devices.

Although the present invention has been particularly described with reference to embodiments thereof, it should be readily apparent to those of ordinary skill in the art that changes and modifications in the form and details may be made without departing from the spirit and scope of the invention. It is intended that the appended claims encompass such changes and modifications. The following claims define the present invention.

What is claimed is:
1. An electrically tintable window comprising:
  a piece of window glass;
  a glass substrate, wherein said glass substrate is smaller than said piece of window glass;
  an electrochromic thin film device formed on said glass substrate; and
  a lamination layer between said electrochromic thin film device and said piece of window glass, said lamination layer attaching said electrochromic thin film device to said piece of window glass, said lamination layer covering the entire area between said electrochromic thin film device and said piece of window glass.
2. An electrically tintable window as in claim 1, wherein said lamination layer includes a bonding agent selected from the group consisting of polyvinyl butyral and ethylene vinyl acetate.
3. An electrically tintable window as in claim 1, wherein said piece of window glass is tempered.
4. An electrically tintable window as in claim 1, wherein said piece of window glass is tinted.
5. An electrically tintable window as in claim 1, wherein said piece of window glass is laminated.
6. An electrically tintable window as in claim 1, wherein said piece of window glass is high strength.
7. An electrically tintable window as in claim 1, wherein said piece of window glass and said glass substrate have different thicknesses.
8. An electrically tintable window as in claim 1, further comprising a frame attached to the top surface of said piece of window glass, wherein said glass substrate fits within said frame.
9. An electrically tintable window as in claim 8, further comprising:
  a glass piece attached to the top of said frame; and
  a sealant positioned around the periphery of said glass piece, said frame and said piece of window glass;
  wherein said glass piece, said frame, said piece of window glass and said sealant are configured to provide a sealed volume within which said electrically tintable device is positioned.
10. An electrically tintable window as in claim 1, wherein said electrochromic thin film device is a solid state thin film device.
11. An electrically tintable window comprising:
  a piece of window glass;
  an electrically tintable sub-assembly; and
  a lamination layer between said electrically tintable sub-assembly and said piece of window glass, said lamination layer attaching said electrically tintable sub-assembly to said piece of window glass, said lamination layer covering the entire area between said electrically tintable sub-assembly and said piece of window glass;
  wherein said electrically tintable sub-assembly includes an electrically tintable thin film device on a glass substrate, and wherein said glass substrate is smaller than said piece of window glass.
12. An electrically tintable window as in claim 11, further comprising a frame, said frame being attached to said piece of window glass, wherein said glass substrate fits within said frame.
13. An electrically tintable window as in claim 12, further comprising:
  a glass piece attached to the top of said frame; and
  a sealant positioned around the periphery of said glass piece, said frame and said glass substrate;
  wherein said glass piece, said frame, said glass substrate and said sealant are configured to provide a sealed volume within which said electrically tintable device is positioned.
14. An electrically tintable window as in claim 11, wherein said electrically tintable thin film device is a suspended particulate device.
15. An electrically tintable window as in claim 11, wherein said electrically tintable thin film device is a polymer dispersed liquid crystal device.
16. An electrically tintable window as in claim 11, wherein said lamination layer includes a bonding agent selected from the group consisting of polyvinyl butyral and ethylene vinyl acetate.
17. An electrically tintable window as in claim 11, wherein said piece of window glass is tempered.
18. An electrically tintable window as in claim 11, wherein said piece of window glass is tinted.
19. An electrically tintable window as in claim 11, wherein said piece of window glass is laminated.
20. An electrically tintable window as in claim 11, wherein said piece of window glass is high strength.

21. An electrically tintable window as in claim 11, wherein said piece of window glass and said glass substrate have different thicknesses.

22. An electrically tintable window as in claim 11, wherein said electrically tintable thin film device is a solid state electrochromic thin film device.

23. An electrically tintable window comprising:

a piece of window glass;

a glass substrate, wherein said glass substrate is smaller than said piece of window glass;

an electrochromic thin film device formed on said glass substrate; and a lamination layer between said glass substrate and said piece of window glass, said lamination layer attaching said glass substrate to said piece of window glass, said lamination layer covering the entire area between said glass substrate and said piece of window glass.

24. An electrically tintable window as in claim 23, wherein said electrochromic thin film device is a solid state thin film device.

* * * * *